July 14, 1942.   F. D. JONAS   2,289,577
SUSPENSION FILING FOLDER AND INDEX TAB
Filed Nov. 8, 1941   3 Sheets-Sheet 1
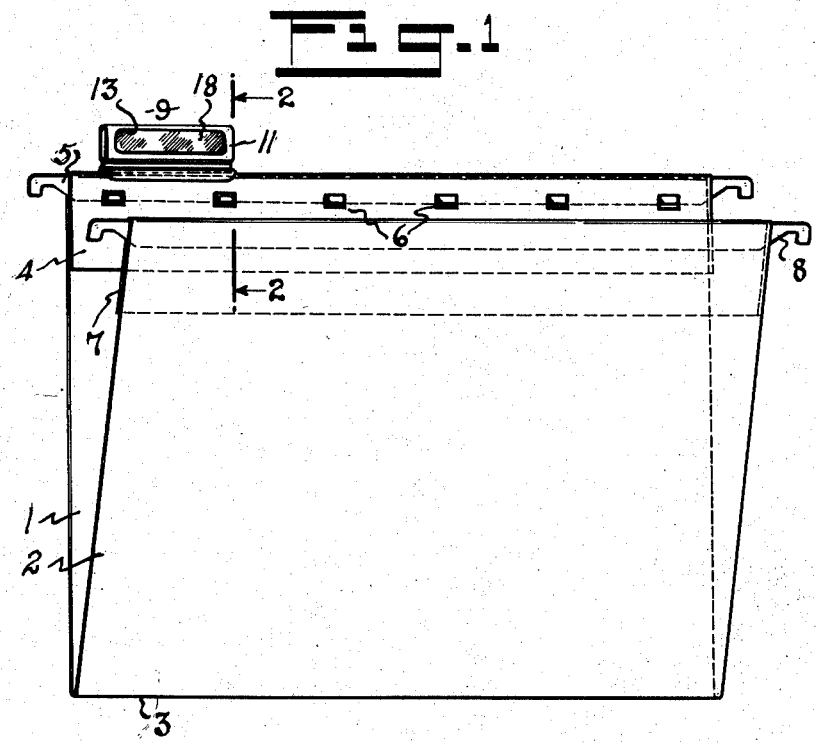
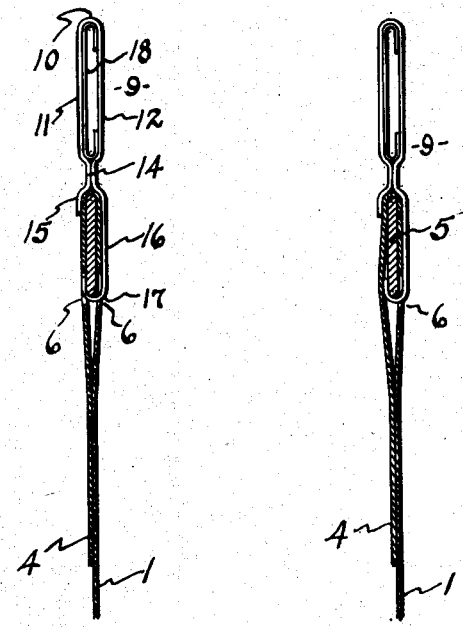
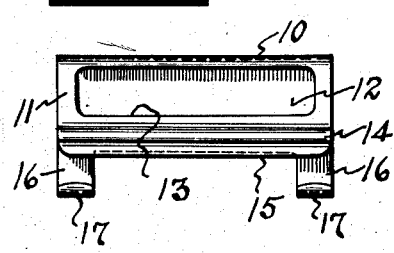
INVENTOR.
Frank D. Jonas
BY
ATTORNEYS July 14, 1942.  F. D. JONAS  2,289,577
SUSPENSION FILING FOLDER AND INDEX TAB
Filed Nov. 8, 1941  3 Sheets-Sheet 2
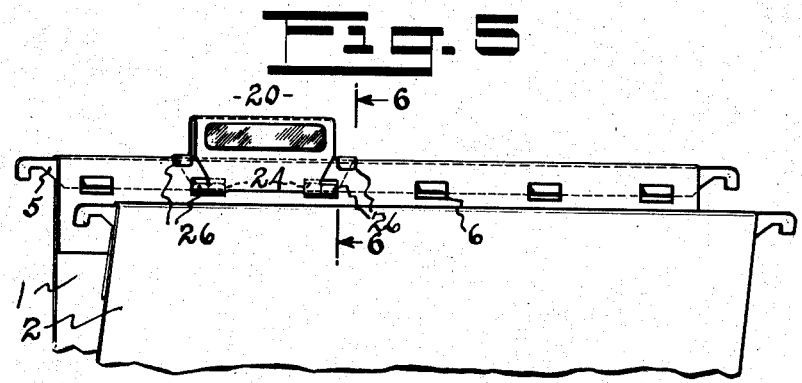
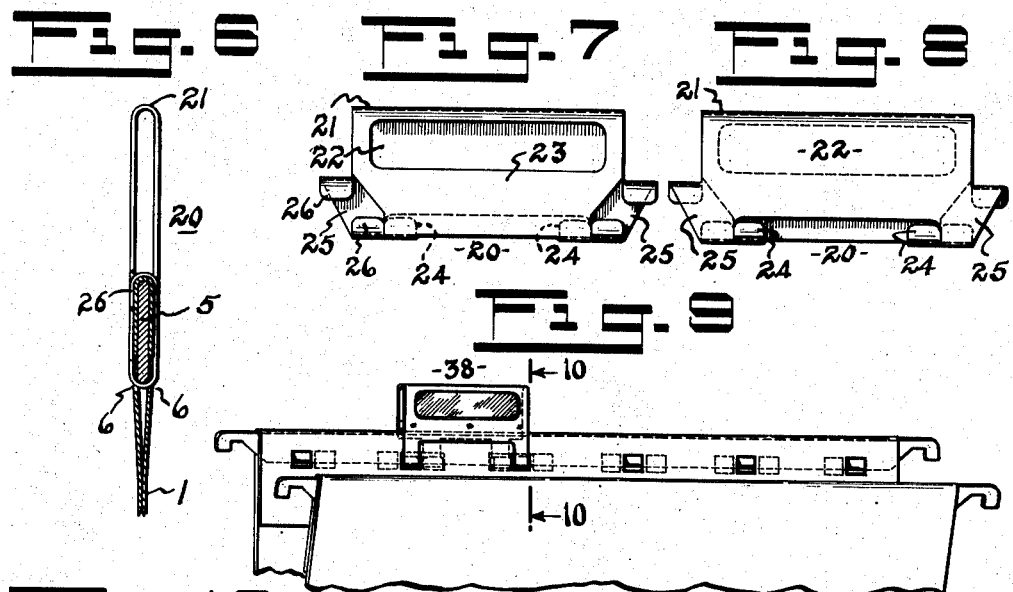
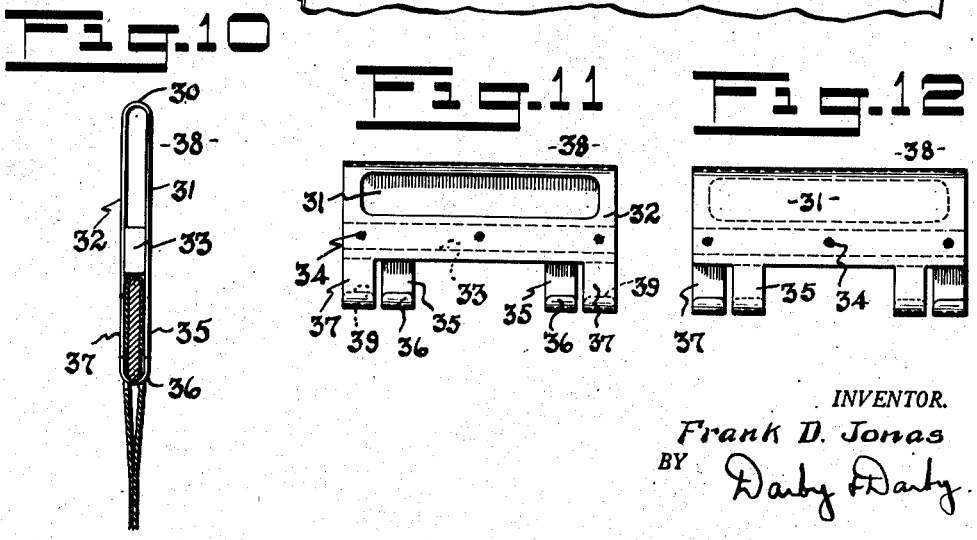
INVENTOR.
Frank D. Jonas
BY Darby & Darby
ATTORNEYS July 14, 1942.  F. D. JONAS  2,289,577
SUSPENSION FILING FOLDER AND INDEX TAB
Filed Nov. 8, 1941  3 Sheets-Sheet 3
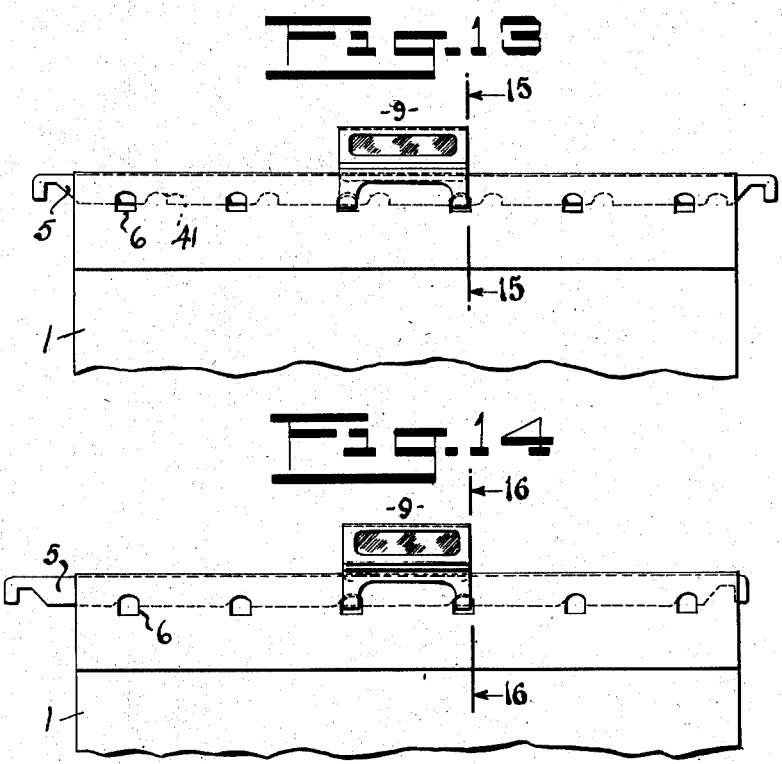
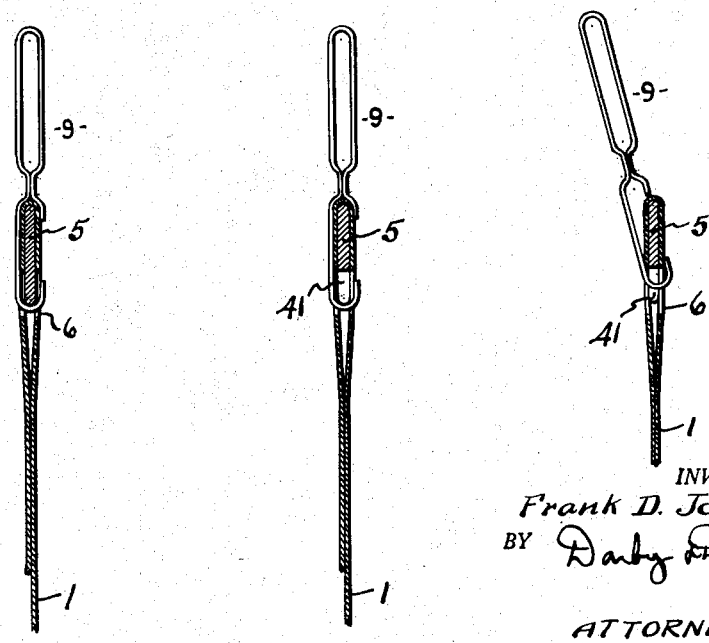
INVENTOR.
Frank D. Jonas
BY Darby & Darby
ATTORNEYS Patented July 14, 1942

2,289,577

UNITED STATES PATENT OFFICE 2,289,577

SUSPENSION FILING FOLDER AND INDEX TAB

Frank D. Jonas, East Williston, N. Y., assignor to Oxford Filing Supply Co., Brooklyn, N. Y., a partnership Application November 8, 1941, Serial No. 418,355

11 Claims. (Cl. 129—16.7)

This invention relates to improvements in index tabs and the method of mounting them with particular relation to filing folders of the suspension type.

A general object of the invention is the provision of an index tab which is simple in structure and so arranged as to permit of easy application to a suspension filing folder in such a manner as to insure firm attachment thereto and in addition to serve the purpose of aiding in locking the associated suspension bar in place on the folder.

Other and more detailed objects of this invention will become clear from the following description when taken with the attached drawings.

This invention resides substantially in the combination, construction, arrangement and relative location of parts as will be described in detail below.

In the accompanying drawings, in which the same reference numerals have been used in the various figures to indicate the same parts.

Figure 1 is a perspective view of one embodiment of the invention as applied to a suspension filing folder;

Figure 2 is a cross-sectional view taken on the line 2—2 of Figure 1;

Figure 3 is a cross-sectional view similar to Figure 2 showing a slightly modified structure;

Figure 4 is a front elevational view of the index tab of the previous figure;

Figure 5 is a perspective broken view of a suspension file having attached thereto a modified index tab in accordance with this invention;

Figure 6 is an enlarged cross-sectional view taken on the line 6—6 of Figure 5;

Figure 7 is a front elevational view of the index tab;

Figure 8 is a rear elevational view thereof;

Figure 9 is a broken perspective view of a portion of a suspension file showing a still further modified form of index tab;

Figure 10 is a cross-sectional view taken on the line 10—10 of Figure 9;

Figure 11 is a front elevational view of this index tab;

Figure 12 is a rear elevational view thereof;

Figure 13 is a front elevational view of an index tab like that in Figures 1 to 4 inclusive applied to a suspension file in which the associated suspension bar is modified for cooperation therewith;

Figure 14 is a view similar to Figure 13 but showing the suspension bar shifted to permit removal of the index tab;

Figure 15 is a cross-sectional view taken on the line 15—15 of Figure 13;

Figure 16 is a cross-sectional view taken on the line 16—16 of Figure 14; and

Figure 17 is the same as Figure 16 but showing how the index tab is easily applied or removed.

The suspension type of filing folder is in rather extensive use today. It consists of a receptacle formed in any suitable manner from fibrous material and provided at its top edges with one or more suspension bars by means of which it may be hung from a suitable support such as rails in a cabinet drawer. A plurality of these folders are arranged in line on supports with their open side upwardly so as to permit of ready access to their respective contents.

It is common practice to use with such filing folders a suitable form of index tab for signaling the contents thereof. This invention is concerned with several novel forms of index tabs which are capable of ready application to and removal from the file folder, as well as attachment at various transverse points, in accordance with required practice. Furthermore, the index tab is so constructed and applied as to cooperate with the associated suspension bar to hold it in place, and to prevent endwise movement thereof, thereby eliminating the necessity for special constructions or fastening means to prevent such movement. At this point it will be apparent from the following description that the structure of the index tab is such that it is capable of use on other types of folders and filing system adjuncts.

A suspension filing folder is illustrated in Figure 1, and is shown as consisting of a sheet of suitable fibrous material folded on a substantially medial transverse line 3 to form a rear wall 1 and a front wall 2, and to thus form a V-shaped receptacle. The upper marginal edge 4 of the rear wall is folded inwardly against the front face of that wall and secured thereto in any suitable manner as by gluing so as to provide a passage at the bend into which the rear suspension rod 5 may be passed. The two plies of the fold are provided with aligned openings 6 suitably spaced across the width of the folder, as clearly shown in Figure 1. The upper marginal edge 7 of the front wall 2 is folded into contact with the inside face of that wall and attached thereto in any suitable manner, as by gluing to form a passage in which the front suspension bar 8 is mounted.

The index tab has been generally indicated by the reference numeral 9. It is made of any suitable material such as Celluloid, cellulose acetate, metal and the like. It has been illustrated in the drawings as being constructed of a metal strip folded along the curve 10 to form an upper chamber by means of the front wall 11 and the rear wall 12. Since this strip is of metal a window 13 is cut in the front wall through which data on an insert strip 18 will appear. The lower ends of the walls 11 and 12 are brought together and secured in any suitable manner, as by means of spot welding. The terminal edge of the front wall is curved outwardly and downwardly, as indicated at 15. The rear wall 12 extends below the region 14 to form a pair of spaced legs 16 which are curved at the ends into hooks as indicated at 17. To apply this tab to a folder the rod is withdrawn and the tab is positioned so that the hook ends 17 project in the apertures 6. The curved edge 15 is slipped over the top of the folder, which action is permitted by reason of the vertical extent of the holes 6. The rod 5 is then slipped back into place so that it passes through the curved ends 17, thereby firmly locking the tab on the folder. The parts shall be so proportioned that the finger 16 will grip the rod 5 and thereby aid in preventing undesired endwise movement.

The construction of Figure 3 is modified only to the extent that the holes 6 are not formed in the front ply 4, but only in the rear ply 1. With this construction the inner face of the rear wall is not perforated.

The construction in Figures 5 to 8 inclusive involves a modified arrangement wherein, however, the folder is the same as that shown in Figure 1. This index tab is generally indicated by the reference numeral 20. Here again it is illustrated as made of a strip of metal folded along the curve line 21 to form the rear wall 22 and the front wall 23, which is provided with an aperture as before. These two walls extend parallel to each other throughout their lengths. The front wall 23 is provided with backwardly curved ends or hooks 24. The rear wall 22 is provided with side extensions or fingers 25 having hooked ends 26 pointing towards each other. This tab may be so constructed that normally the front and rear walls will flare outwardly from the bend 21, so that they must be pressed into parallel relation at the time the suspension bar 5 is threaded through the hooks 24 and 26. The tendency of the structure to spring back and get in place thereby locks and firmly secures the tab on the folder. The upper hooked ends 26 rest over the top edge of the rear wall so that this tab is immovable in a vertical direction.

Figures 9 to 12 inclusive illustrate a modified construction with respect to the index tab 38. Here again a strip of material is folded along the curve 30 to provide parallel rear and front portions 31 and 32 respectively. A window is cut in the front wall as before, and a spacer bar 33 is secured between the walls at a suitable point by means of spot welds 34. The rear wall has downwardly extending fingers 35 terminating in hooked ends 36. The front wall has downwardly extending fingers 37 terminating in hooked ends 39. This tab is mounted in a manner similar to the others, and the fingers 35 and 37 may be normally sprung outwardly requiring compression at the time of threading the suspension bar through them to lock all the parts in place. The spacer bar 33 forms a stop against the top edge of the folder.

The modification in Figures 13 to 17 inclusive employs an index tab like the tab 9 of Figure 1. In this case, however, the associated suspension bar 5 is provided with a series of properly spaced notches 41 along its bottom edge. When the bar is in normal position as shown in Figure 13, the notches 41 are positioned to the sides of the hooked ends of the fingers of the tab. In order to remove the tab the bar 5 is shifted endwise a short distance to align the adjacent notches 41 with the hooked ends of the tab, whereupon it may be removed, as is illustrated in Figures 16 and 17. The index tab of Figures 13 to 17 inclusive has been shown reversed front to back with respect to its position in Figure 1, but obviously this involves no structural features since it can be applied to this last construction in the same way it is applied to the first.

From the above description it will be apparent to those skilled in the art that the principles of this invention may be embodied in various other physical forms, and I do not, therefore, desire to be strictly limited to the illustrated disclosure herein, but rather to the true scope of the claims which are granted me.

What is claimed is:

1. In a structure of the type described the combination with a filing folder having a suspension bar attached thereto and apertures overlapping the lower edge of the suspension bar, of an index tab having depending fingers terminating in hooked ends, the hooked ends lying in said apertures and embracing the lower edge of said bar.

2. In a structure of the type described the combination with a filing folder having a suspension bar attached thereto and apertures overlapping the lower edge of the suspension bar, of an index tab having depending fingers terminating in hooked ends, the hooked ends lying in said apertures and embracing the lower edge of said bar, said index tab being shaped to provide an insert chamber and having a shoulder gripping the top edge of the folder.

3. In a construction of the type described the combination with a filing folder having a wall, a suspension bar attached to said wall and apertures through the wall overlapping said bar, of an index tab having a pair of parallel walls terminating in opposed hooked ends, the walls of said tab embracing the top edge of said wall and hooked ends embracing the lower edge of said bar through said apertures.

4. In a construction of the type described the combination with a filing folder having a wall, a suspension bar attached to said wall and apertures through the wall overlapping said bar, of an index tab having a pair of parallel walls terminating in opposed hooked ends, the walls of said tab embracing the top edge of said wall and hooked ends embracing the lower edge of said bar through said apertures, one of said walls having ears overlying the top edge of said wall.

5. In a construction of the type described the combination of a suspension filing folder having at least one wall, a suspension bar secured to said wall and apertures in the wall overlapping the lower edge of the bar, an index tab comprising a formed strip of material providing an insert chamber and formed with hooked legs embracing the top edge of said folder with the hooked ends lying in said apertures and embracing the lower edge of said suspension bar.

6. In a construction of the type described the combination including a suspension filing folder having at least one wall folded upon itself to form a passage, a suspension bar in said passage and slidable endwise therein and apertures in said wall overlapping the lower edge of said bar, of a index tab embracing the top edge of said wall, and having hooked fingers lying in said apertures and embracing the lower edge of said bar to grip it.

7. In a construction of the type described the combination including a suspension filing folder having at least one wall folded upon itself to form a passage, a suspension bar in said passage and slidable endwise therein and apertures in said wall overlapping the lower edge of said bar, of an index tab embracing the top edge of said wall, and having hooked fingers lying in said apertures and embracing the lower edge of said bar to grip it, and ears on said tab embracing the top edge of the folder.

8. In a construction of the type described the combination including a suspension filing folder having at least one wall folded upon itself to form a passage, a suspension bar in said passage and slidable endwise therein and apertures in said wall overlapping the lower edge of said bar, of an index tab embracing the top edge of said wall, and having hooked fingers lying in said apertures and embracing the lower edge of said bar to grip it, said bar having a notched lower edge, the notches being disposed to one side of said hooked ends when the bar is in normal position.

9. In a construction of the type described the combination including a suspension filing folder having at least one wall folded upon itself to form a passage, a suspension bar in said passage and slidable endwise therein and apertures in said wall overlapping the lower edge of said bar, of an index tab having hooked fingers lying in said apertures and embracing the lower edge of said bar to grip it, and ears on said tab embracing the top edge of the folder.

10. In a construction of the type described the combination including a suspension filing folder, a suspension bar attached adjacent a top edge of said folder, said folder having apertures in its wall overlapping the lower edge of said bar, and an index tab having hooked fingers lying in said apertures and embracing the lower edge of said bar to grip it, and ears on said tab embracing the top edge of said wall.

11. A filing folder adjunct comprising a member forming at least one wall, a suspension bar attached to said wall along its top edge, said wall having apertures therein overlapping the lower edge of said bar, and an index tab engaging the top edge of said wall and having hooked fingers lying in said apertures and embracing the adjacent edge of said bar.

FRANK D. JONAS.